(No Model.) 2 Sheets—Sheet 2.
W. P. GROOM.
PROCESS OF AND APPARATUS FOR HARVESTING COTTON.
No. 477,177. Patented June 14, 1892.
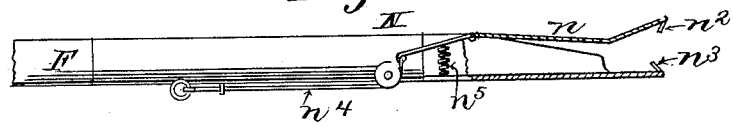
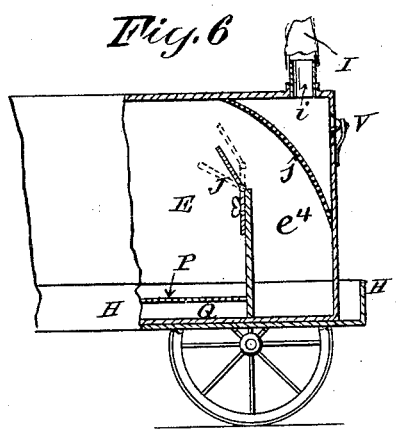
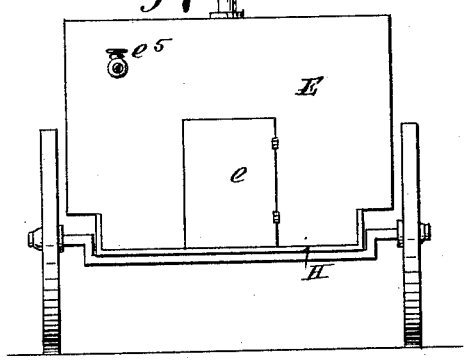
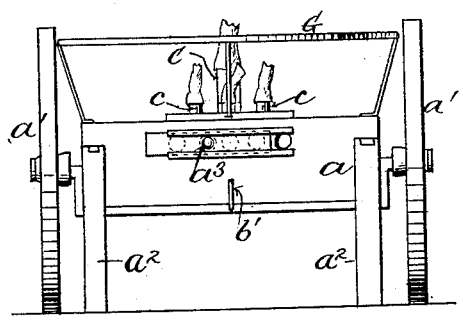
Witnesses:
D. W. Gardner
G. T. Miatt
Inventor:
Wallace P. Groom,
By his Attorney
George William Miatt

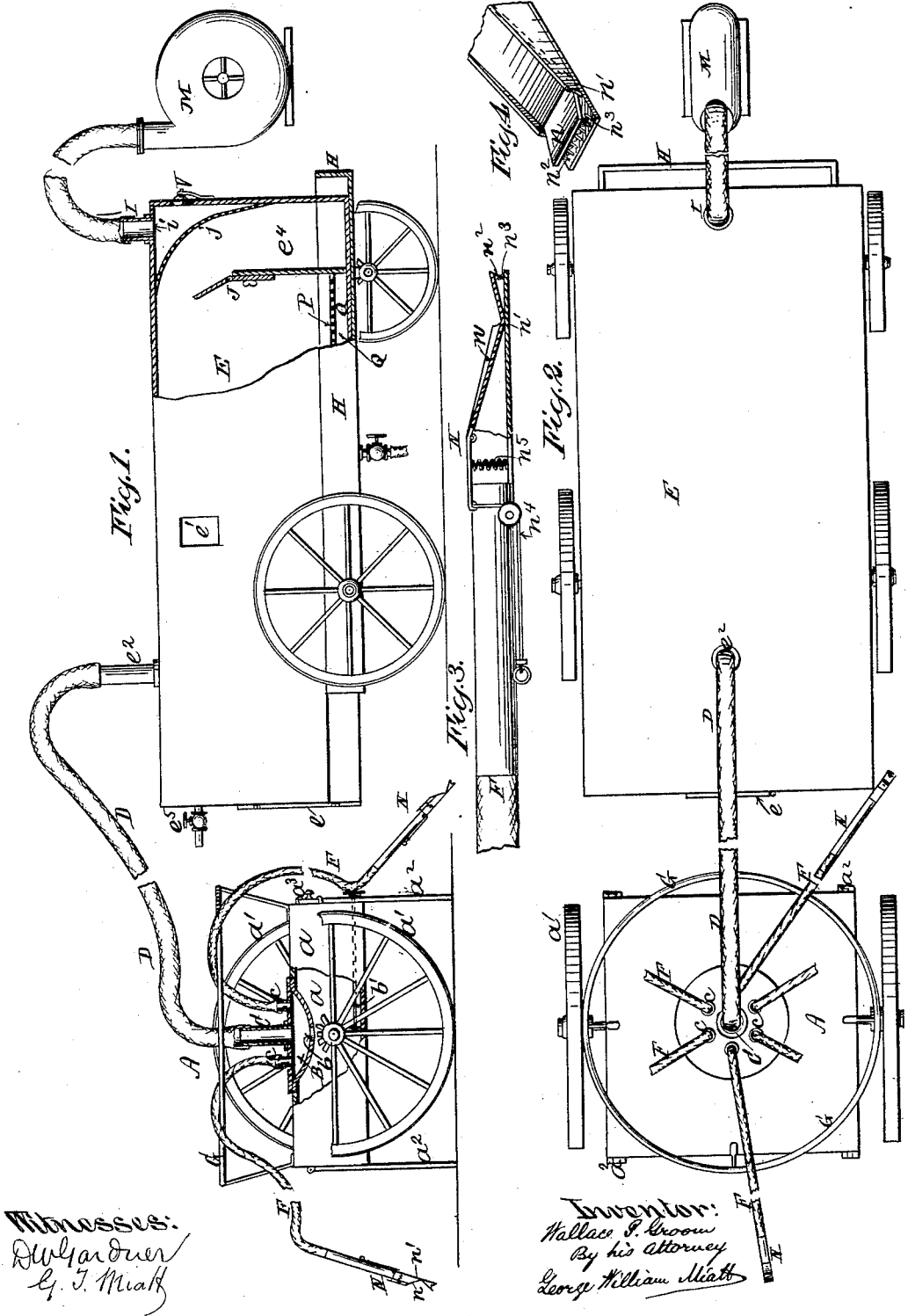

UNITED STATES PATENT OFFICE.

WALLACE P. GROOM, OF BROOKLYN, NEW YORK.

PROCESS OF AND APPARATUS FOR HARVESTING COTTON.

SPECIFICATION forming part of Letters Patent No. 477,177, dated June 14, 1892.

Application filed June 1, 1891. Serial No. 394,689. (No model.)

*To all whom it may concern:*

Be it known that I, WALLACE P. GROOM, a citizen of the United States, residing in the city of Brooklyn, in the county of Kings and State of New York, have invented certain new and useful Improvements in Processes of and Apparatus for Harvesting Cotton, of which the following is a description sufficient to enable others skilled in the art to which the invention appertains to make and use the same.

My invention relates to an improved method of and apparatus for harvesting cotton by the utilization of air-currents induced by suction. Heretofore various complicated and expensive devices have been designed for the purpose of harvesting cotton; but they have not been made available for practical application and use.

The distinguishing feature of my invention consists in the combination and arrangement of a comparatively small perambulating vacuum box or chamber which receives and transfers the cotton from a series of hand suction-tubes through a common delivery-pipe to a comparatively large portable vacuum box or chamber adapted to receive and temporarily house as well as to facilitate the transportation in bulk of the harvested cotton. The vacuum box or chamber is connected while in use with the perambulating receiver and with an air-exhausting device, which latter acts not only to maintain a partial vacuum in the storage box or chamber, but also by reason of the connection of the latter with the perambulator to afford the suction-power by which the picking devices are rendered effective. The vacuum storage box or chamber not only affords convenient means for housing temporarily comparatively large quantities of cotton in the field and of providing for its transportation in bulk, but it also fulfills the functions of a settling-chamber in which the lighter impurities—such as leaf, dust, &c., with which seed-cotton is contaminated—are separated and withdrawn therefrom.

An important feature of my invention, taken in connection with my system of harvesting and temporarily housing cotton in the field, consists in the special construction and arrangement of the cotton-picking device, whereby it closes automatically when not held open intentionally to receive the cotton, and by means of which the cotton may be seized and drawn out of the opening cotton-bolls in cases where the suction afforded by the picking device when open is insufficient to accomplish the purpose.

Another important feature of my invention relates to the construction and arrangement of the perambulating receiver, whereby the cotton from a series of picking devices is received into a common receptacle, separated from sand, hulls, (or bolls,) twigs, &c., and from thence transferred to a comparatively large storage and settling box or chamber.

In the accompanying drawings I illustrate diagrammatically the essential parts for carrying out my improvements in practice, although I do not wish to confine myself to the identical form and arrangement of parts shown, since it is obvious that various modifications may be made in structure without deviating from the essential features of my invention.

Figure 1 is an elevation of my improved cotton-harvesting apparatus; Fig. 2, a plan of the same; Fig. 3, a side elevation, on an enlarged scale, of the cotton-picking device; Fig. 4, an isometrical view of the jaws of the same closed. Fig. 5 is a view similar to Fig. 3, showing the receiving-jaws open. Fig. 6 is a sectional elevation of the rear end of the storage-box; Fig. 7, a front end elevation thereof, and Fig. 8 an elevation of the perambulating vacuum-box.

The main portion of the perambulator A consists of an inclosed box or chamber $a$, mounted upon wheels $a'$ and provided with suitable adjustable legs or braces $a^2$, by which it may be sustained in a required position or situation.

Situated in the chamber $a$ is a small receiving and transfer compartment B. This transfer-compartment B is preferably bowl-shaped and communicates by means of a small orifice $b$ in its bottom with the interior of the box or chamber $a$.

Projecting upward centrally from the transfer-compartment B is a stand-pipe C, to which is attached the outer end of the flexible pipe D, which connects the transfer-compartment of the perambulator with the storage vacuum box or chamber E. In the top of the transfer-compartment B, around the stand-pipe C, is arranged a series of smaller stand-pipes or couplings $c$ $c$, to which the inner ends of the flexible hand picker-tubes F are attached. A railing G, preferably circular, extends around and higher than the stand-pipes C $c$ $c$ to afford a bearing or rest for the flexible hand-tubes F, which radiate in all directions from the transfer-compartment B, and may be bent and manipulated freely in any direction over and among the cotton-plants.

The vacuum-chamber $a$ temporarily holds the sand, hulls, (or bolls,) twigs, and other heavier-grade impurities that may be brought in with the cotton through the hand-tubes F into the transfer-compartment B, and which fall through the bottom orifice $b$.

A rake or pusher $b'$ is arranged within the chamber $a$, adapted to be manipulated from without for the purpose of distributing the refuse matter upon the floor of the closed chamber to avoid obstructing the aperture $b$. Air is admitted to the chamber $a$ in small volume through a valve or damper $a^3$ for the purpose of causing an upward current through the orifice $b$ sufficient to prevent the descent of cotton through the orifice $b$, but not strong enough to prevent the descent of the heavier impurities.

The storage-chamber E is a large closed box, which may be supported, when desired, by a suitable truck H. It is provided with an air-tight door or manhole $e$ and with one or more air-tight windows or sight-holes $e'$, through which the accumulation of "seed-cotton" can be observed. A stand-pipe $e^2$ projects upward from the top of the storage-chamber E to receive and support the inner end of the flexible transfer-hose D. The air-exhaust hose I is also connected, preferably, with the top of the said box or chamber E, and through it the air is withdrawn from the said box or chamber, preferably at or near one end, as indicated in the drawings. The exhaust-opening $i$ is protected by a perforated or reticulated screen $j$, which prevents the escape of cotton. In front of the screen $j$ may be arranged a deflecting-partition or dash-board J, which may be adjusted in height or inclination so as to check and cause the seed-cotton to fall back into the main chamber, while permitting the lighter impurities, as leaf, &c., to pass over it and into the compartment $e^4$ beneath the screen $j$. Air is admitted in small volume at the opposite end of the box or chamber E, as at $e^5$, to aid in taking up and carrying away the dust, &c., from the seed-cotton.

It will be seen that the vacuum storage box or chamber E constitutes practically a settling-chamber similar in arrangement and operation to that described in my application for patent, Serial No. 394,690, filed June 1, 1891, and I seek to cover it herein only in its portable form and in combination with the other parts of my cotton-harvesting apparatus, substantially as herein shown and described.

The exhaust-hose I connects the vacuum box or chamber E with any suitable form of air-exhausting apparatus M of a capacity sufficient to maintain the requisite degree of vacuum throughout the apparatus. In the drawings the air-exhausting device is represented as a rotary fan, to be driven by any appropriate power.

The cotton-picking device or mouth N is of peculiar construction. It has a movable jaw $n$, which closes upon a rigid jaw $n'$. Both jaws are formed with inwardly-projecting teeth $n^2$ $n^3$. The jaw $n$ when closed prevents the entrance of air. It is opened by a finger-pull or trigger $n^4$ and closed automatically, when released, by a spring $n^5$.

Any equivalent arrangement of parts may be substituted which will effect the automatic closing of the mouth or picking device, except when purposely held open by a suitable appliance to be operated by the hand. The teeth $n^2$ $n^3$ prevent the return of the cotton when once within or between the jaws, but do not prevent the entering of the cotton into the tubes and thence to the vacuum box or chamber.

The operation of harvesting cotton with my improved apparatus and according to my method is substantially as follows: The portable storage box or chamber E and perambulator A having been taken to a desired location are connected together by the flexible transfer-pipe D. The vacuum box or chamber E is then connected with the air-exhausting device M and suitable power applied thereto to create and maintain the required degree of vacuum within the box or chamber E under the conditions of use. The vacuum in the storage box or chamber E draws the air admitted through the picking devices N of the picker-tubes F and up through the orifice $b$ in the bottom of the transfer-compartment B through the transfer-pipe D and into the said settling and storage box or chamber E, from which it is in turn drawn through the exhaust-hose I and exhausting device M. Thus when a picking device or mouth N is presented to an open boll of cotton the cotton is sucked into and through the tube F. In case the cotton is not thus readily detached from the boll the jaws $n$ $n'$ are allowed to close upon the cotton, and when thus seized the cotton is detached from the boll by a slight pull on the part of the manipulator. The mouth N being then opened again, the cotton passes into and through the tube F to the perambulating receiver. The tubes F convey the cotton to the transfer-compartment B, from which it is drawn into the transfer-pipe D and conveyed to the storage and settling box or chamber E; but in passing through the transfer-chamber B the cotton is lifted and drawn away from sand, hulls, (or bolls,) &c., that may have accompanied it through the tubes F, the said impurities dropping to the bottom of the bowl B and through the orifice $b$ therein. In passing through the aperture $b$ the impurities, as before stated, encounter an upward current of air which sifts out the cotton carried down with the impurities and conveys it to the transfer-tube D. In the storage box or chamber E the seed-cotton settles to the floor, while the leaf, dust, &c., are carried away from it by the suction of the exhaust device M. The dust passes off through the screen, but the leaf, &c., striking against said screen, fall into the compartment $e^4$ apart from the seed-cotton. By regulated admission of air at the other extremity of the chamber or at any other convenient point the operation of eliminating the dust, leaf, &c., may be facilitated. Since the perambulator A may be moved around the storage box or chamber E for a considerable radius, and since the picker-tubes F may be bent and manipulated so as to cover quite a large space, of which the perambulator is the center, it will be seen that a considerable quantity of cotton may be harvested without moving the storage box or chamber E. When the latter is as full as it may be desirable to have it, it is disconnected from the perambulator A and from the air-exhausting device M and another storage box or chamber may be substituted in its place.

The storage box or chamber E is provided with an automatic vacuum-valve V to avoid attaining more than a prescribed degree of tension or vacuum within the apparatus.

I prefer to form the storage box or chamber E with a false perforated bottom P, creating a compartment Q, into which warm vapor or dry air may be introduced or forced through a tube or pipe, as may be desired.

What I claim as my invention, and desire to secure by Letters Patent, is—

1. The process herein set forth of harvesting cotton, consisting in collecting it from the different plants by air-currents induced by a partial vacuum and then separating it from the coarser impurities by an auxiliary air-current induced by the partial vacuum, substantially as described.

2. The process herein set forth of harvesting cotton, consisting in collecting it from the different plants by air-currents induced by a partial vacuum, separating it from the coarser impurities by an auxiliary air-current induced by the partial vacuum, allowing it to settle while under partial vacuum, and drawing off the dust and lighter impurities by suction.

3. In cotton-harvesting apparatus, the combination of the closed perambulator provided with a plurality of flexible hand-tubes, a portable storage box or chamber connected with said perambulator by a flexible suction-pipe, and mechanism for creating and maintaining a partial vacuum within said storage box or chamber and throughout the apparatus, substantially in the manner and for the purpose set forth.

4. In apparatus for harvesting cotton, substantially as described, the combination of a closed perambulator provided with a series of flexible hand-tubes discharging into a common transfer-compartment having an opening for the discharge of heavy impurities into the main body of the perambulator, a portable storage box or chamber connected with said transfer-compartment by a flexible suction-pipe, and mechanism for creating and maintaining a partial vacuum within said storage box or chamber and the rest of the apparatus, substantially in the manner and for the purpose described.

5. In apparatus for harvesting cotton, substantially as described, the combination of the closed perambulator provided with a series of flexible hand-tubes discharging into a common transfer-compartment having an opening for the discharge of heavy impurities into the main body of the perambulator, a valve or damper in the main body of the perambulator for controlling the volume of air to be admitted thereto and upward through the aperture in the bottom of the transfer-compartment, a portable storage box or chamber connected with said transfer-compartment by a flexible suction-pipe, and mechanism for creating and maintaining a partial vacuum within said storage box or chamber and the rest of the apparatus, substantially in the manner and for the purpose described.

6. In apparatus for harvesting cotton, substantially as described, the combination of a picking device formed with an automatically-closing jaw, a flexible hand-tube connecting said picking device with the transfer-compartment of a closed perambulator, a suction-tube connecting said transfer-compartment with a portable storage box or chamber, and mechanism for creating and maintaining a partial vacuum throughout the apparatus, substantially in the manner and for the purpose set forth.

7. In apparatus for harvesting cotton, substantially as described, the combination of a picking device formed with inwardly-projecting teeth, an automatically-closing jaw and mechanism for opening the same, a flexible hand-tube connecting said picking device with the transfer-compartment of a perambulator, a suction-tube connecting said transfer-compartment with a portable storage box or chamber, and mechanism for creating and maintaining a partial vacuum throughout the apparatus, substantially in the manner and for the purpose described.

8. In apparatus for harvesting cotton, substantially as described, the combination of a closed perambulator having a series of flexible hand-tubes, a portable storage and settling box or chamber connected with said perambulator by a flexible suction-tube, a valve or damper for regulating the admission of air to said portable storage and settling box or chamber, and mechanism for creating and maintaining a partial vacuum within said storage and settling box or chamber and throughout the apparatus, substantially in the manner and for the purpose described.

9. In apparatus for harvesting cotton, substantially as described, the combination of a closed perambulator having a series of flexible collecting hand-tubes, a portable storage and settling box or chamber connected with said perambulator by a flexible suction-tube, mechanism for creating and maintaining a partial vacuum throughout the apparatus, and an automatic vacuum-valve arranged in the apparatus to limit the internal tension of air, substantially in the manner and for the purpose described.

WALLACE P. GROOM.

Witnesses:
GEORGE WILLIAM MIATT,
D. W. GARDNER.